(12) United States Patent
Hoctor et al.

(10) Patent No.: US 7,313,127 B2
(45) Date of Patent: Dec. 25, 2007

(54) METHOD AND APPARATUS FOR SYNCHRONIZING A RADIO TELEMETRY SYSTEM BY WAY OF TRANSMITTED-REFERENCE, DELAY-HOPPED ULTRA-WIDEBAND PILOT SIGNAL

(75) Inventors: Ralph Thomas Hoctor, Saratoga Springs, NY (US); Stephen Michael Hladik, Albany, NY (US)

(73) Assignee: General Electric Company, Niskayuna, NY (US)

( * ) Notice: Subject to any disclaimer, the term of this patent is extended or adjusted under 35 U.S.C. 154(b) by 996 days.

(21) Appl. No.: 10/125,091

(22) Filed: Apr. 19, 2002

(65) Prior Publication Data

US 2003/0198212 A1 Oct. 23, 2003

(51) Int. Cl.
*H04J 3/06* (2006.01)
(52) U.S. Cl. .................... 370/350; 370/503
(58) Field of Classification Search ............ None
See application file for complete search history.

(56) References Cited

U.S. PATENT DOCUMENTS

| | | | |
|---|---|---|---|
| 4,641,317 A | | 2/1987 | Fullerton |
| 4,718,109 A | * | 1/1988 | Breeden et al. ............ 455/503 |
| 5,544,155 A | * | 8/1996 | Lucas et al. ................ 370/342 |
| 5,825,805 A | * | 10/1998 | Kato ........................... 375/130 |
| 6,141,337 A | * | 10/2000 | Uta et al. .................... 370/350 |
| 6,252,962 B1 | * | 6/2001 | Sagey ......................... 380/274 |
| 6,433,739 B1 | * | 8/2002 | Soliman ...................... 342/387 |
| 6,515,622 B1 | * | 2/2003 | Izadpanah et al. .......... 342/368 |
| 6,519,464 B1 | * | 2/2003 | Santhoff et al. .......... 455/456.5 |
| 6,734,726 B2 | * | 5/2004 | Billsberry ..................... 330/52 |
| 6,952,456 B1 | * | 10/2005 | Aiello et al. ................. 375/295 |
| 6,977,956 B2 | * | 12/2005 | Ando et al. .................. 375/147 |
| 6,996,075 B2 | * | 2/2006 | Santhoff et al. ............. 370/310 |
| 7,042,417 B2 | * | 5/2006 | Santhoff et al. ............. 343/893 |
| 2001/0053175 A1 | * | 12/2001 | Hoctor et al. ............... 375/130 |
| 2002/0137510 A1 | * | 9/2002 | Sims et al. .................. 455/427 |
| 2003/0001669 A1 | * | 1/2003 | Billsberry ..................... 330/52 |
| 2003/0090436 A1 | * | 5/2003 | Schantz et al. .............. 343/908 |

(Continued)

OTHER PUBLICATIONS

"Ultra-Wideband Communications System," HW Tomlinson et al., U.S. Appl. No. 09/753,443, filed Jan. 3, 2001.

(Continued)

*Primary Examiner*—Edan Orgad
*Assistant Examiner*—Blanche Wong
(74) *Attorney, Agent, or Firm*—Fletcher Yoder

(57) ABSTRACT

A time-division-multiplexed radio communication system and method uses transmitted-reference, delay-hopped (TR/DH) ultra-wideband (UWB) broadcast signal to provide a pilot signal to all mobile devices in a coverage area from which time synchronization is derived. Using this TR/DH UWB pulse pilot signal and low-complexity demodulation in the mobile devices, the mobile devices utilize a simple signal detection algorithm to acquire synchronization with the pilot signal. As a result, all devices in a local area network become synchronized to the system's bit clock. This greatly reduces the search space required for signal acquisition, receiver signal processing complexity, and length of message preambles required to synchronize the base station receiver to a transmission from any of the mobile devices.

38 Claims, 11 Drawing Sheets

U.S. PATENT DOCUMENTS

| | | | |
|---|---|---|---|
| 2003/0091022 A1* | 5/2003 | Blanz et al. | 370/350 |
| 2003/0108133 A1* | 6/2003 | Richards | 375/351 |
| 2003/0134647 A1* | 7/2003 | Santhoff et al. | 455/456 |
| 2003/0161382 A1* | 8/2003 | Hershey et al. | 375/130 |
| 2005/0094719 A1* | 5/2005 | Young | 375/222 |

OTHER PUBLICATIONS

"Ultra-Wideband Communications System and Method Using a Delay Hopped, Continuous Noise Transmitted Reference," RT Hoctor et al., U.S. Appl. No. 09/974,032, filed Oct. 10, 2001.

"Transmitter Location for Ultra-Wideband, Transmitted-Reference CDMA Communication System," RT Hoctor et al., U.S. Appl. No. 09/973,140, filed Oct. 9, 2001.

"Synchronization of Ultra-Wideband Communications Using a Transmitted-Reference Preamble," RT Hoctor et al., U.S. Appl. No. 10/125,091, filed Apr. 19, 2002.

"Impulse Radio: How It Works," MZ Win, RA Sholtz, IEEE Comm. Letters, vol. 2, No. 2, Feb. 1998, pp. 36-38.

"Antennas and Propagation for Wireless Communication Systems," Saunders et al., John Wiley & Sons, 1999, pp. 282-285.

* cited by examiner

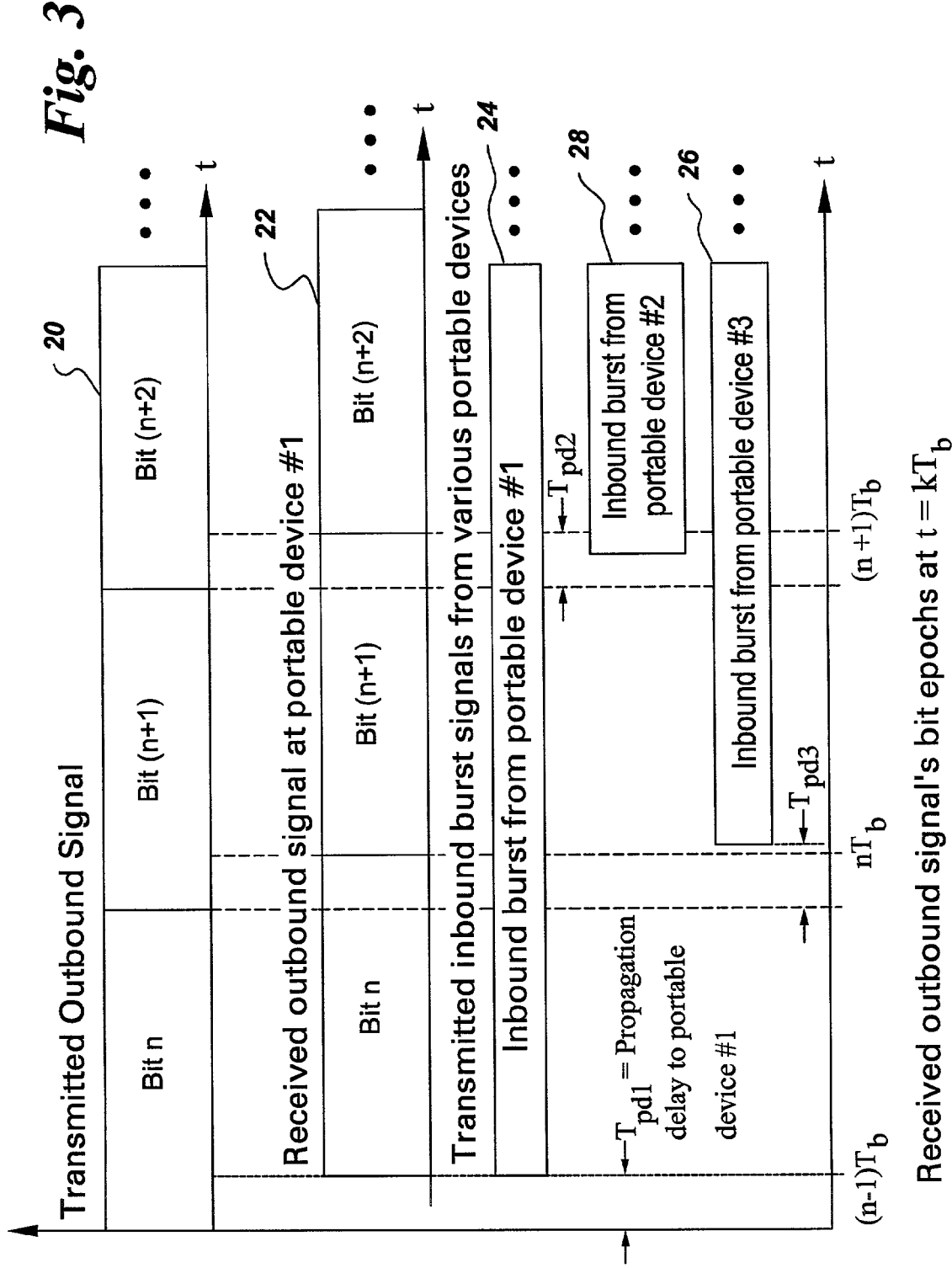

METHOD AND APPARATUS FOR SYNCHRONIZING A RADIO TELEMETRY SYSTEM BY WAY OF TRANSMITTED-REFERENCE, DELAY-HOPPED ULTRA-WIDEBAND PILOT SIGNAL

CROSS REFERENCE TO RELATED APPLICATIONS

The subject matter of this application is related to copending patent application Ser. No. 09/753,443 filed Jan. 3, 2001, by H. W. Tomlinson, Jr., J. E. Hershey, R. T. Hoctor, and K. B. Welles, II, for "Ultra-Wideband Communication System", copending patent application Ser. No. 09/974,032 filed Oct. 10, 2001, by R. T. Hoctor, D. M. Davenport, A. M. Dentinger, N. A. Van Stralen, H. W. Tomlinson, Jr., K. B. Welles, II, and J. E. Hershey for "Ultra-Wideband Communication System and Method Using a Delay-Hopped, Continuous Noise Transmitted Reference", copending patent application Ser. No. 09/973,140 filed Oct. 9, 2001, by R. T. Hoctor, J. E. Hershey and H. W. Tomlinson, Jr., for "Transmitter Location for Ultra-Wideband, Transmitted-Reference, CDMA Communication System", and copending patent application Ser. No. 10/125,092 filed Apr. 19, 2002, by R. T. Hoctor and S. Hladik for "Synchronization of Ultra-wideband Communications Using a Transmitted-reference Preamble" all of which are assigned to the assignee of this application. The disclosures of applications Ser. No. 09/753,443, Ser. No. 09/974,032, Ser. No. 09/973,140, and Ser. No. 10/125,092 are incorporated herein by reference.

BACKGROUND OF THE INVENTION

This invention relates to a transmitted-reference, ultra-wideband (TR-UWB) radio communication system and, in particular, to a scheme for using such a signal as a pilot signal that all radio transmitters in a coverage area can receive and derive time synchronization therefrom.

The use of time division multiple access (TDMA) to synchronize multiple transmitters that wish to make use of the same channel is well-known in the communications art. In the TDMA scheme, multiple transmitters make use of a communication channel serially, each one receiving a time slot during which it has exclusive use of the channel. Another scheme for the coordination of multiple transmitters that is related to TDMA is slotted random access. An example of this type of technique is the slotted ALOHA media access approach. In a slotted random access system, transmitters may use the channel at any time they like, but their transmissions must start at a time determined by a certain clock. This clock determines the slots at which transmissions may take place.

One problem associated with both the TDMA scheme and the slotted random access scheme is the establishment and maintenance of a common time base to regulate the transmission times of the transmitters. In general, some kind of clock has to be distributed to all the transmitters to allow them to transmit at the right time. In some radio-based TDMA systems, this is done by assigning a time slot to the master receiver, during which it broadcasts a message, and having all of the transmitters receive this signal and use its time of arrival at the transmitter as a time mark. Thus, some portion of the channel bandwidth is used to transmit timing information rather than data. This information-bearing bandwidth need not be lost if the timing information can be distributed to the transmitters using some kind of out-of-band channel.

Ultra-wideband (UWB) communications is the name given to a type of radio transmission which works by transmitting pulses; in fact, another name for this type of communications is "impulse radio". (See M. Z. Win and R. A. Sholtz, "Impulse radio: how it works", *IEEE Comm. Letters*, vol. 2, pp. 36-38, February 1988, and L. W. Fullerton, "Spread spectrum radio transmission system", in U.S. Pat. No. 4,641,317.)

Recently, a new UWB communications scheme, called transmitted-reference, delay-hopped (TR/DH) ultra-wideband, has been invented, as described in copending patent application Ser. Nos. 09/753,443 and 09/974,032. The term "transmitted reference" refers to the transmission and reception of multiple pulses in such a manner that synchronization with the individual pulses is unnecessary. Transmitted reference UWB transmits pulses in pairs, and thereby induces a correlation at the receiver that can be measured by standard means. The term "delay-hopped" refers to a code-division multiple access (CDMA) scheme which uses transmitted-reference UWB.

In addition to the standard ultra-wideband (or "impulse radio") version of TR/DH, the inventors have invented and experimented with a version of TR/DH that uses wideband noise as a carrier, rather than impulse trains. This version of the invention induces correlation at the receiver by transmitting the sum of two versions of a wideband, continuous noise, separated by a log known to the receiver. This invention has advantages in that the noise carrier may be easier to generate than the impulse train carrier, and it is described in copending patent application Ser. No. 09/974,032. In addition to transmitting information TR/DH UWB can be used to establish a time mark with respect to a clock at the receiver; in this way it can be used to distribute a clock. This application is described in copending patent applications Ser. No. 09/973,140 and Ser. No. 10/125,092.

BRIEF SUMMARY OF THE INVENTION

The present invention solves the signal acquisition problem associated with time-division-multiplexed or time-slotted communications by utilizing a TR/DH ultra wideband transmission as a pilot signal that all devices in the coverage area can receive and derive synchronization therefrom. The transmitted-reference ultra-wideband pulse pilot signal is broadcast from a central node or base station, located in the coverage area, to all devices that are to have their transmission times synchronized. The devices utilize a simple signal detection algorithm to acquire synchronization with the pilot signal to an accuracy of roughly 10 nanoseconds. Then, signal acquisition may be completed by a fine acquisition algorithm, if required. As a result, all devices in a local area network become synchronized to the system's bit clock. This allows either a TDMA or slotted transmission to take place in the reverse, or inbound, direction, from the device to the central node.

This invention is of particular interest for hospital asset and personnel tracking, medical telemetry for ambulatory patient monitoring, and wireless local area network data communications for productivity and patient-care quality enhancements.

It is also of interest for wireless process monitoring and control applications.

BRIEF DESCRIPTION OF THE DRAWINGS

FIG. 3 is a timing diagram showing the synchronization of inbound signal to outbound signal's bit epoch;

DETAILED DESCRIPTION OF THE INVENTION

Figure 1:
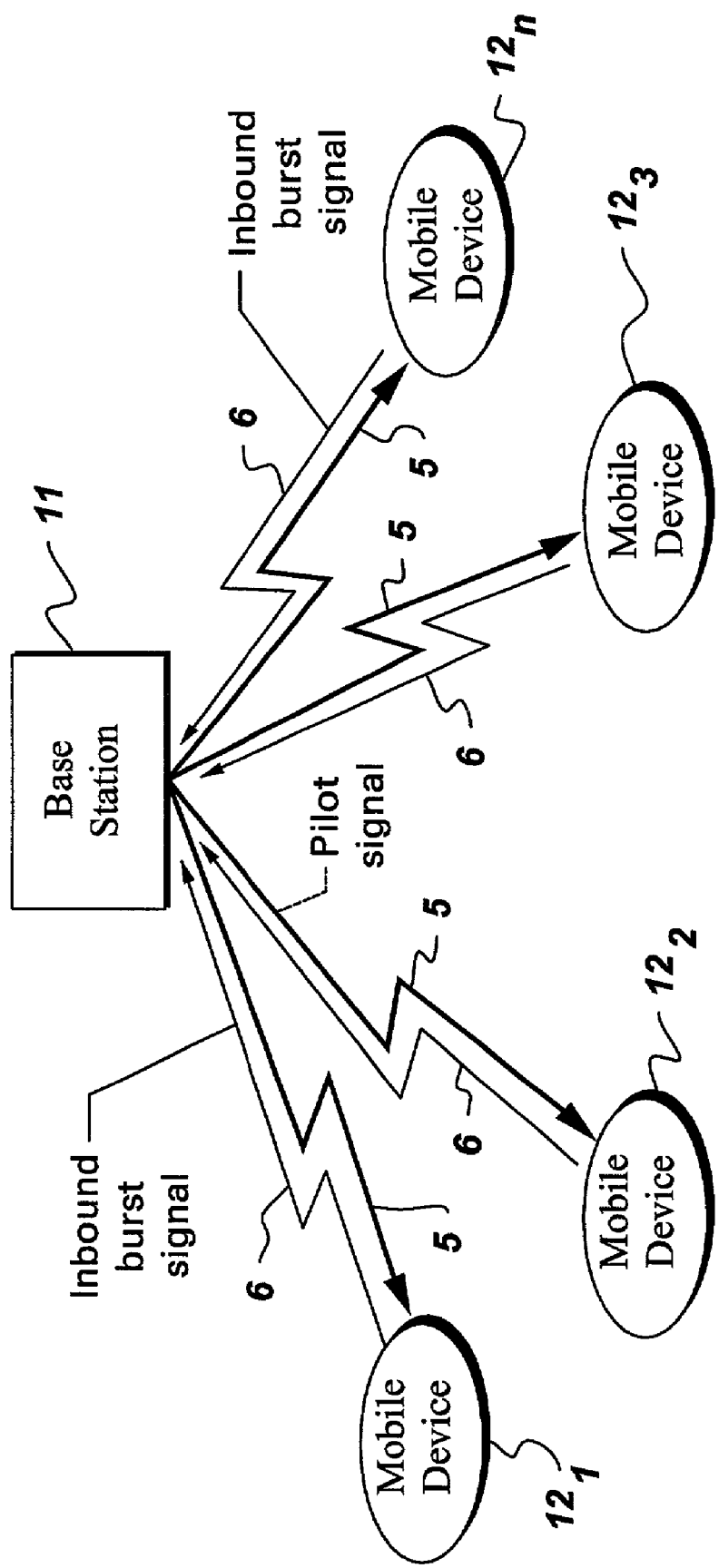
FIG. 1 is a block diagram illustrating a one-cell system architecture and signal paths on which the invention may be implemented.

FIG. 1 illustrates a block diagram of one embodiment of the invention. It comprises a base station 11, which transmits a delay-hopped, transmitted-reference ultra-wideband (TR/DH-UWB) pilot signal (as described in copending patent applications Ser. Nos. 09/753,443 and Ser. No. 09/974,032, and one or more mobile radio devices $12_1$, $12_2$, $12_3$, $12_n$. These mobile radio devices include a receiver that can receive the TR/DH pilot signal 5 and a transmitter for sending messages to the base station. The burst signals 6 transmitted by the mobile radio devices are synchronized with periodic cell epochs that are carried by the pilot signal. As a result, the uncertainties in the times of arrival of inbound bursts at the base station may be greatly reduced by use of a slotted transmission scheme. This in turn reduces the search interval required for signal acquisition, receiver signal processing complexity, and length of message preambles. Alternatively, interference between inbound bursts in the same frequency band can be eliminated by use of a TDMA scheme. In a preferred embodiment, the mobile devices' transmit signals with narrowband modulation, such as Gaussian Minimum Shift Keying (GMSK).

Figure 2:
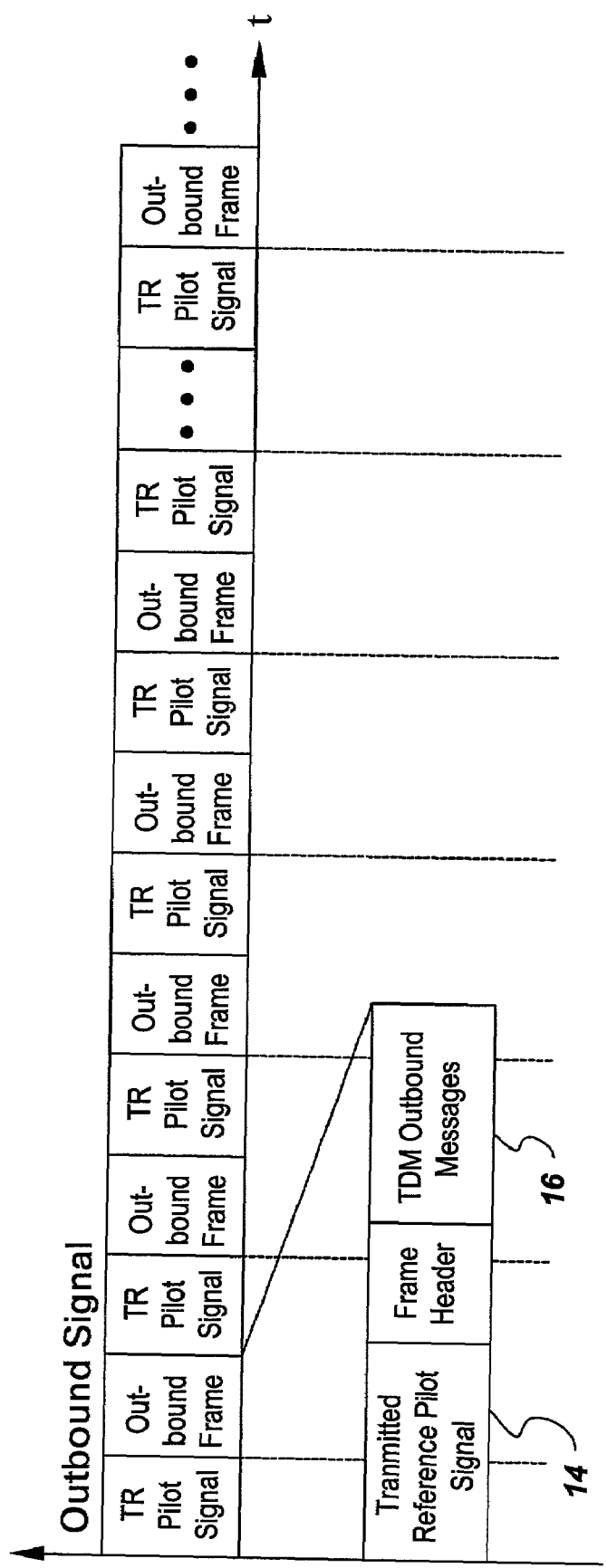
FIG. 2 is a block diagram illustrating the air interface-outbound signal structure.

The outbound signal transmitted by the base station 11 may be an unmodulated transmitted-reference, delay-hopped UWB, i.e., a pilot signal that is only used by the mobile devices to obtain synchronization with the base station's symbol clock, or it may comprise both pilot and message (data) carrying components as shown in FIG. 2. The air interface for this invention is designed so that inbound bursts are coincident with a periodic epoch conveyed to the mobile devices by the base station via its outbound signal.

The TR/DH UWB modulation scheme provides multiple access capacity through the use of the delay-hopping CDMA codes. The fact that multiple DH codes can be transmitted simultaneously and received without error means that multiple uncoordinated TDMA or slotted systems can be in simultaneous operation using this scheme.

In one slotted random access scheme embodiment of the invention, the cell's epoch is any bit epoch of the received outbound signal. In a preferred embodiment of this invention illustrated in FIG. 3, the mobile radio transmits inbound messages beginning at a bit boundary of any received bit in the outbound signal. The timing relationships among the transmitted outbound signal, outbound signal received at a given portable device, and the inbound message signals transmitted by several portable devices are shown in FIG. 3 for an exemplary case. If M-ary modulation is used wherein M>2, inbound transmissions are synchronized to any symbol epoch in the received outbound signal. Another alternative embodiment is that the beginning of any specified fields in the received outbound signal are used as a cell epochs. Yet another embodiment is that the specified field be used to identify a particular mobile device or a group of mobile devices that are permitted to transmit. This feature can be used to implement a TDMA system.

Figure 4A:
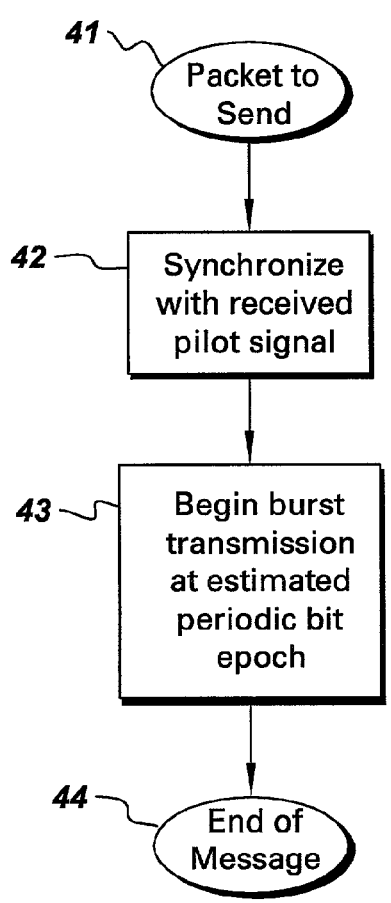
FIGS. 4A and 4B are, respectively, flow charts of the process by which portable devices synchronize to an outbound signal from a base station and the base station demodulator's operation.

FIG. 4A is a flowchart that describes the method used by the mobile devices to synchronize their transmissions with the cell's bit-time epoch. When a mobile device has data to send at input block 41, its receiver synchronizes with the pilot signal broadcast by the base station in function block 42. Then, function block 43, the mobile device begins its burst transmission at the estimated periodic bit epoch (or symbol epoch) until the end of the message at output block 44.

Figure 4B:
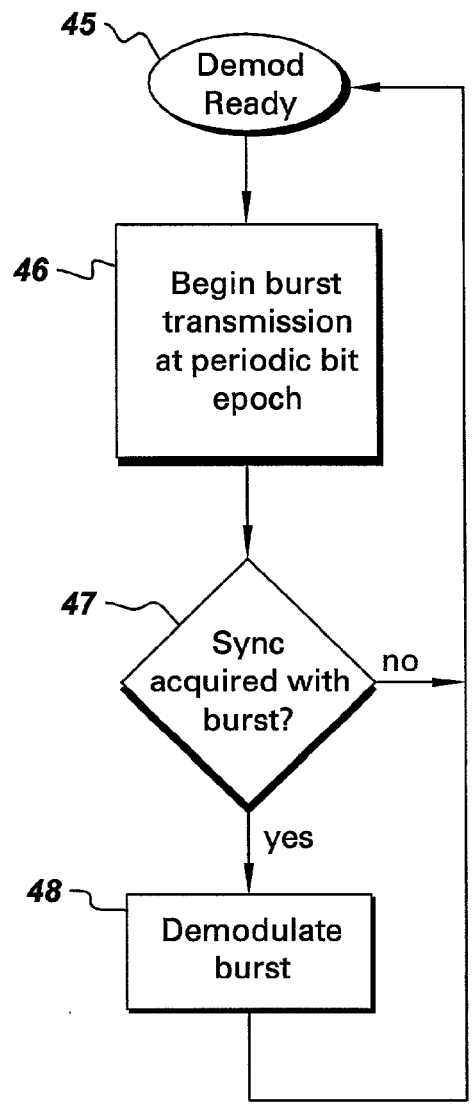

Burst acquisition can be simplified in the base station by taking advantage of the a priori knowledge that the beginning of inbound bursts will be found near the symbol epochs of the outbound pilot signal. FIG. 4B is a flowchart of a base station demodulator's operation. When a demodulator is in the ready state 45 to acquire a new burst, it begins the acquisition process at the cell's periodic epoch in function block 46. At the end of the acquisition interval, a decision is made in decision block 47 on whether or not a burst has been acquired. If not, the demodulator returns to the ready state 45. If a burst has been acquired, the demodulator proceeds to demodulate the burst in function block 48. After the burst has been demodulated, the demodulator returns to the ready state 45.

It should be emphasized that the flowcharts of FIGS. 4A and 4B can apply to either a TDMA system or a slotted random access system implemented using a TR/DH pilot signal. In the TDMA system, means must be provided in the outbound message structure to identify the mobile device or devices that may transmit. In the slotted system, no such identification is necessary, since the mobile devices themselves make the decision of when to transmit. In the TDMA system, the pilot signal must be structured so as to allow the device that "owns" the time slot to complete its transmission before other potentially interfering devices are allowed to transmit. In the slotted random access system, transmissions are allowed to overlap, even if this causes interference; therefore, the slots in such a system can be more closely spaced than the duration of a message from the mobile devices.

Figure 5:
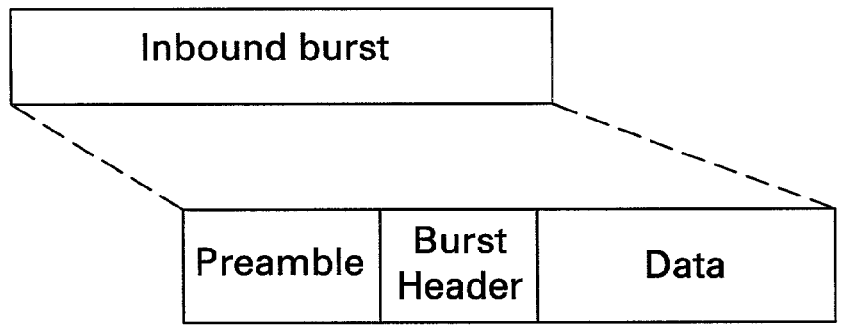
FIG. 5 is a block diagram showing an example of an inbound burst structure.

One possible embodiment of the inbound burst is shown in FIG. 5. It comprises a preamble to aid in burst acquisition, a burst header and data.

Synchronization of inbound bursts with the cell epochs conveyed by the outbound signal greatly reduces the uncertainty in burst time of arrival, particularly in local area networks wherein propagation delays are very small relative to a bit interval. As a result burst acquisition time by base station demodulators is greatly reduced. The time uncertainty in the reception of an unsynchronized burst transmission requires that the receiver first detect the presence of the RF burst, then synchronize to its symbol timing, and finally synchronize to its phase relative to a local phase source. In contrast, the uncertainty in inbound burst epochs at the base station in our invention is limited to approximately twice the maximum propagation delay, which is typically much smaller than a symbol interval in a wireless local area network. For example, the propagation delay for every 3 meters in range between transmitter and receiver is only 10 nanoseconds. Even at a range of 60 meters the propagation delay is quite small (200 nanoseconds) compared to a symbol interval for a 10 kbps link (100 microseconds). For this example, the time uncertainty at the base station is reduced by a factor of 500. This allows the receiver to dispense with burst detection and symbol timing synchronization, although phase synchronization must still be accomplished.

Figure 6:
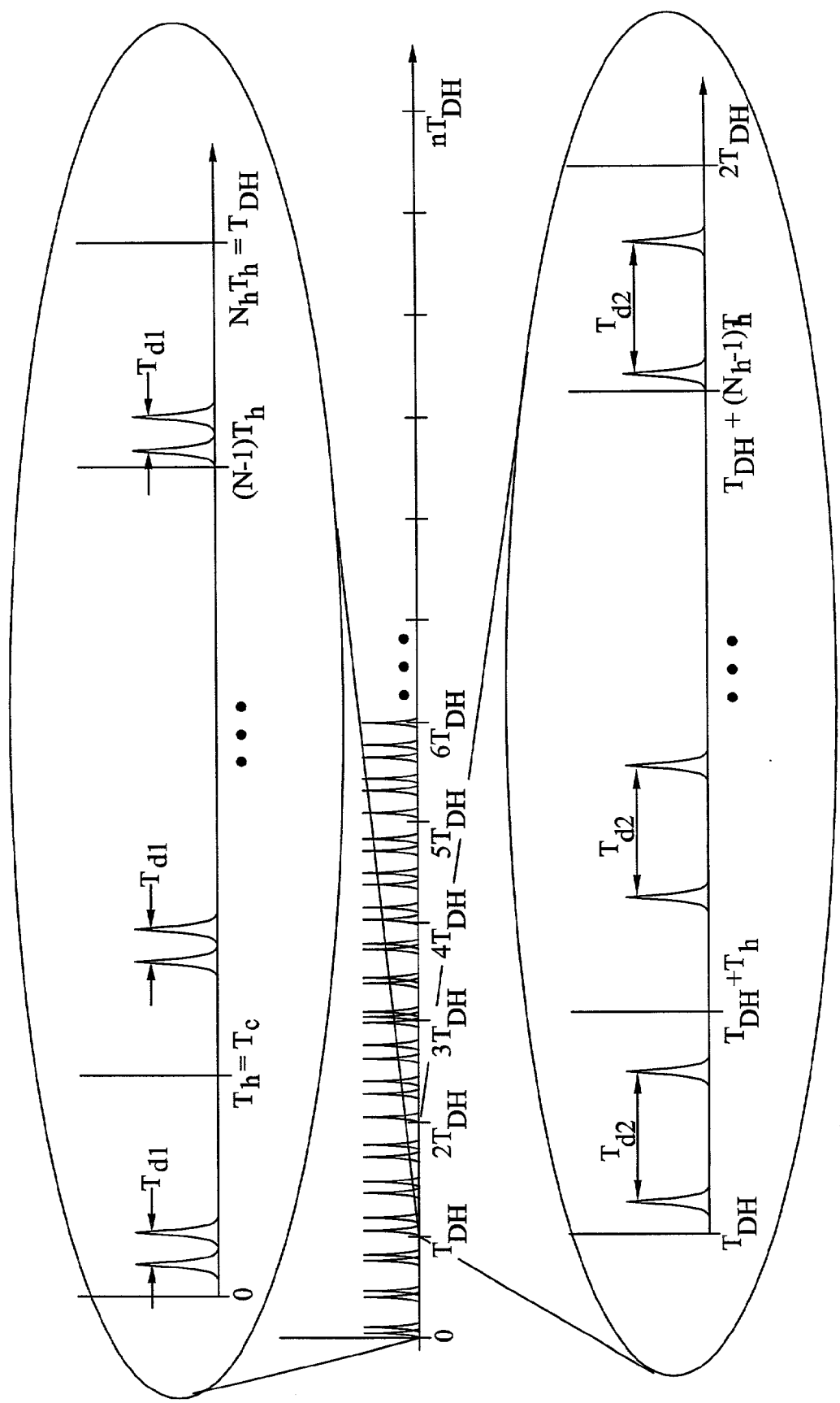
FIG. 6 is a timing diagram illustrating the structure of an outbound pilot signal.

FIG. 6 illustrates the outbound pilot signal utilized in this invention when the impulse radio version of TR/DH signal is used for the pilot signal. As shown in FIG. 6, each chip comprises a number $N_h$ of time-hopping intervals over which the delay between the information-bearing pulse and reference pulse is constant. Also as shown in FIG. 6, the delay between the information-bearing pulse and reference pulse during the $k^{th}$ delay-hopping interval (or dwell interval) is denoted $T_{dk}$.

Figure 7:
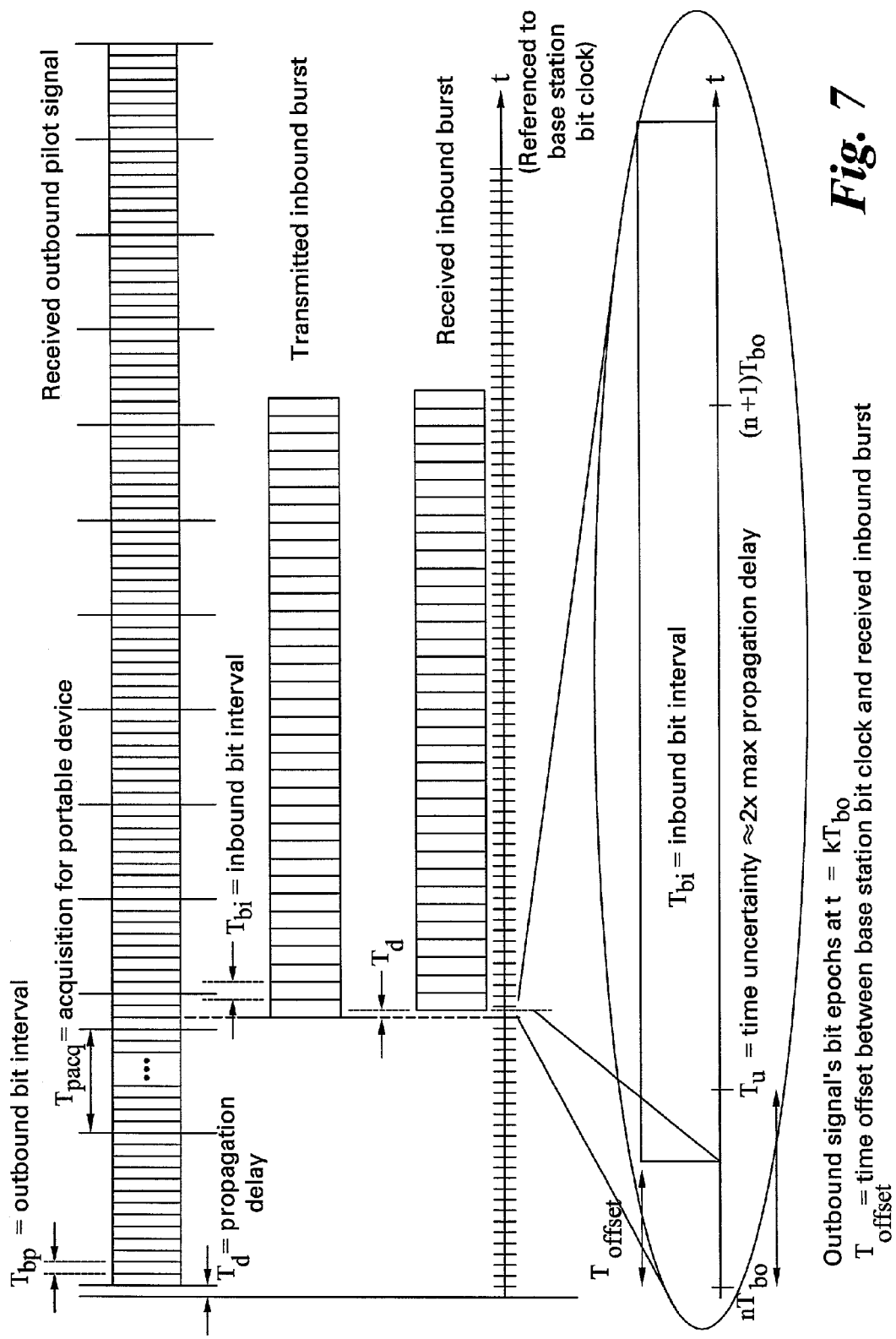
FIG. 7 is an illustration of the timing relationships among the outbound pilot signal, the inbound burst and the base station clock.

The timing relationships between the various signals in a system that utilizes an outbound ultra-wideband pilot signal to establish a slotted random access scheme are illustrated in FIG. 7. In this figure, the tick marks on the time axis delineate the bit intervals of the outbound (base-to-mobile) signal referenced to the transmitter. Note that the outbound bit interval $T_{bo}$ may be different from the inbound bit interval $T_{bi}$. By way of example, the bottom portion of FIG. 7 shows a magnification of the timing of the received inbound signal (from a mobile transmitter) at a base station. In this example, the first bit of the inbound signal arrives at the base station $T_{offset}$ seconds from the leading edge of the n th outbound bit boundary. The time offset between an outbound bit epoch and the initial bit epoch of the received inbound signal is approximately equal to twice the propagation delay between the mobile and base transceivers. As a result, the maximum uncertainty in the time of arrival for an inbound message is determined primarily by the maximum range between the base and mobile units. When the base and mobile transmit at the same bit rate, $T_{offset}$ is the time offset between any of the bit epochs in the received inbound message and the nearest epoch in the outbound signal.

Figure 8:
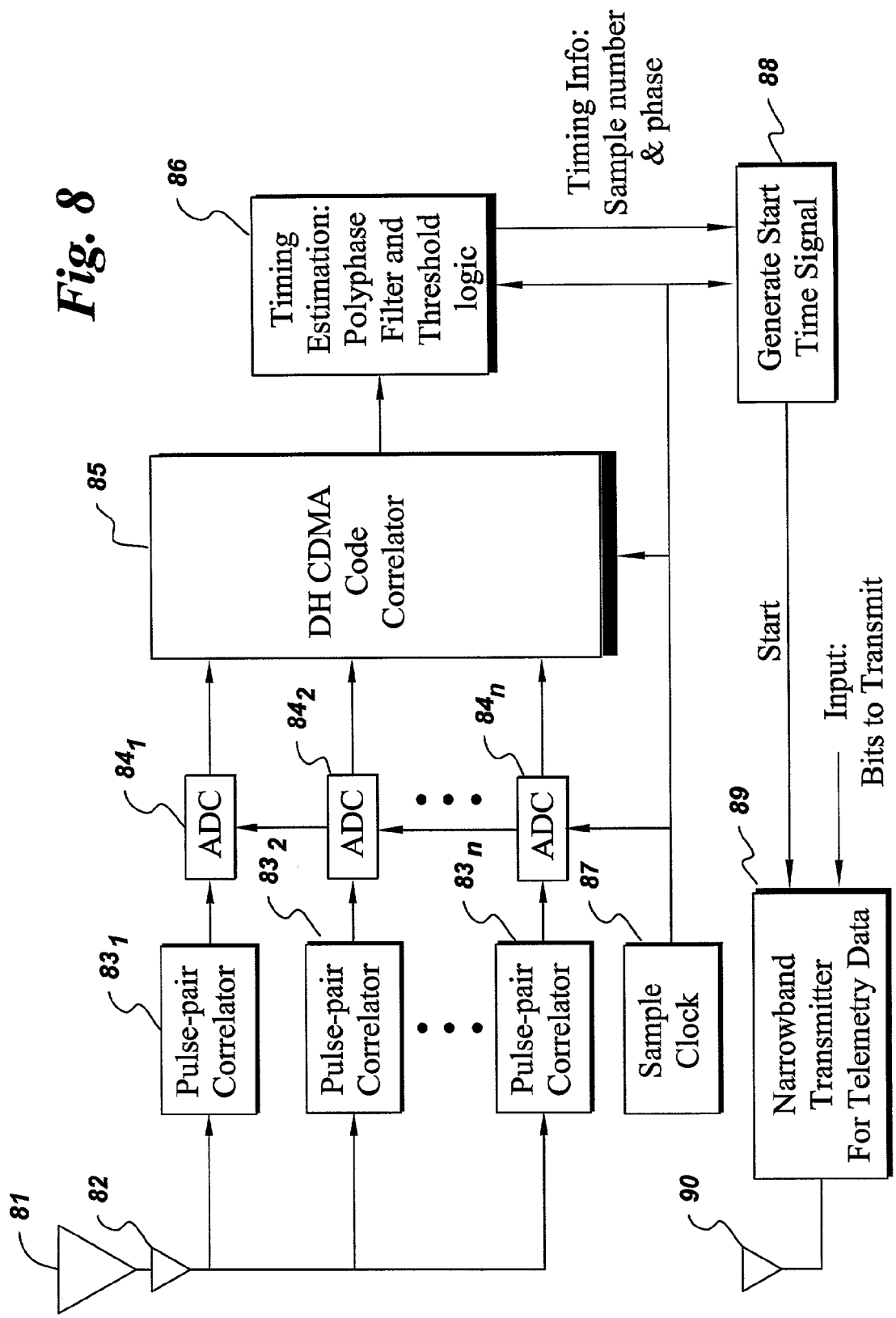
FIG. 8 is a block diagram of the mobile UWB receiver and narrowband transmitter.

FIG. 8 is a block diagram of a TR/DH receiver and narrowband transmitter such as would be used by the mobile device. The receiver for a TR/DH code word comprises an antenna 81 and an RF amplifier 82 followed by a bank of pulse-pair correlators $83_1$ to $83_n$ and a DH code word correlator 85. The analog output of each pulse pair correlator is digitized by a corresponding one of the analog-to-digital converters (ADCS) $84_1$ to $84_n$ before being input to the all-digital DH code correlator 85. A typical value of the sample rate at which this digitization takes place would be in the range of 1 to 20 MHz, and would provide at least 2 samples in each chip interval.

Figure 9:
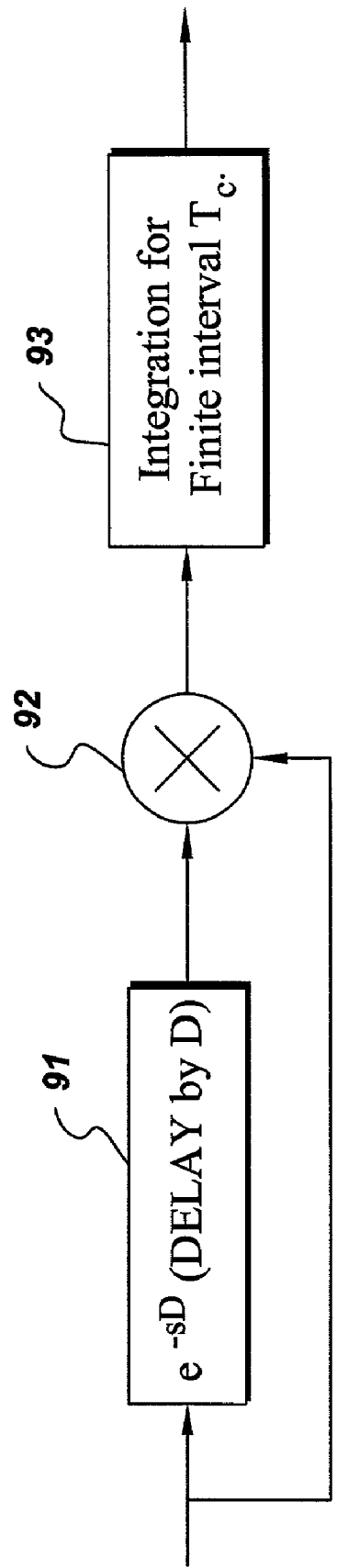
FIG. 9 is a block diagram of a pulse pair correlator for a lag D.

A pulse pair correlator is depicted in FIG. 9. A pulse-pair correlation consists of a delay 91, a signal multiplier 92 and a finite-time integrator 93. The signal is split into two paths, one of which is delayed by delay 91. The two versions of the received signal are multiplied in multiplier 92, and the product is integrated over a specified time, $T_c$, by integrator 93. The integration time is equal to the chip time. The delay is such that the leading pulse or noise carrier of the delayed circuit path is registered in time with the trailing pulse or noise carrier of the un-delayed circuit path. This non-zero-mean product is integrated over a chip interval to produce a chip signal.

Figure 10:
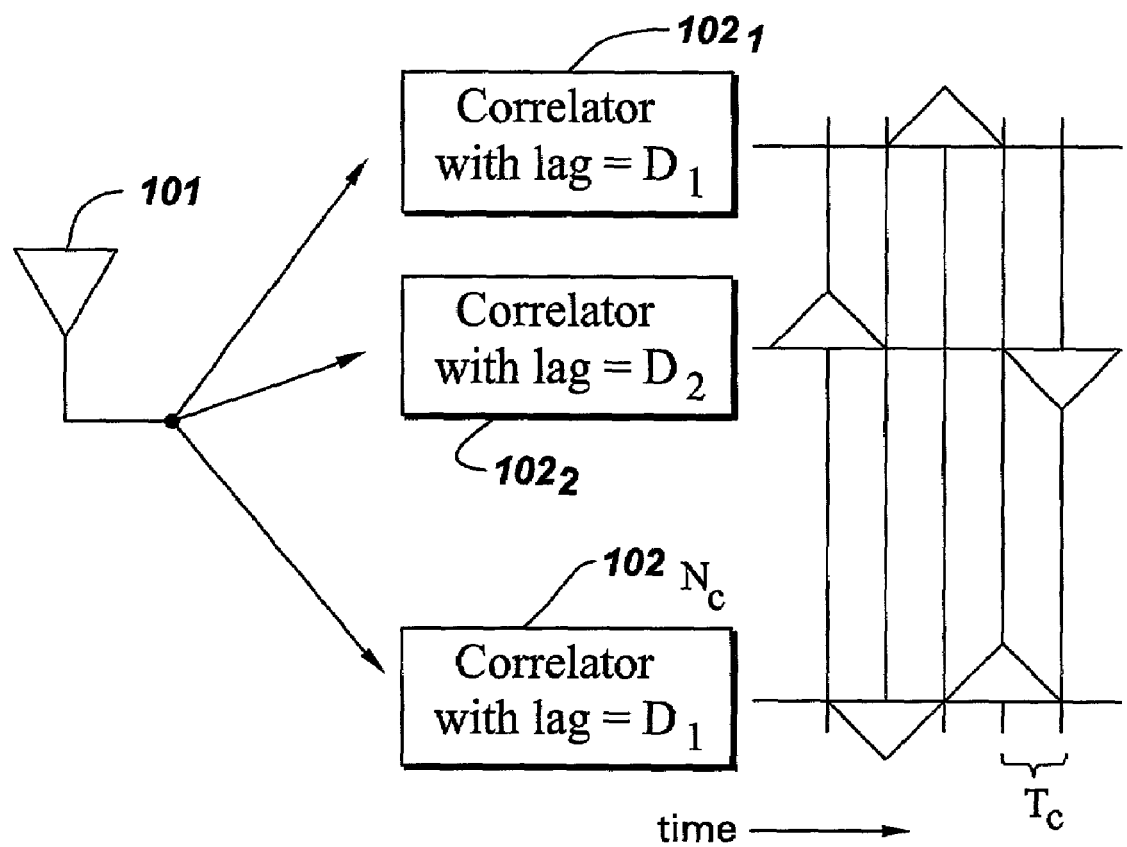
FIG. 10 is a block diagram of the first stage of the UWB TR delay-hopped CDMA receiver, with illustrations of a set of outputs of the pulse pair correlators.

The chip signals at the outputs of the bank of pulse pair correlators are characteristically peaked as shown in FIG. 10. The antenna 101 provides inputs to correlators $102_1$ to $102_{N_c}$, which comprise a bank of pulse-pair correlators shown in FIG. 9. These signals are of duration approximately equal to twice the integration time of the pulse pair correlators. This set of waveforms will be sampled at a rate yielding at least two samples per chip period, and then sent to a delay-hopped code detector.

The CDMA code correlator 85 in FIG. 8 will take samples of the multiple outputs of the bank of pulse pair correlators $83_1$ to $83_n$ and add them together in a manner dictated by the expected CDMA code word. The objective of this operation is to produce the registered sum of all the chip signals. When the expected code word matches the transmitted code word, this operation will have the effect of applying a gating waveform, matched to the entire delay hopped (DH) code word waveform, to the observed data at the output of the correlators. If the gating waveform matches the shape of the chip signal waveform, a matched filter is implemented; however, this requires knowledge of the relative timing of the sample clock and the transmitter chip clock. If the gating waveform applied to the individual chip is rectangular, with duration $2T_c$, then the effect of the CDMA code word correlator is to add all of the individual chip waveforms in phase, producing an output which is a high-SNR version of the individual chip waveform.

Figure 11:
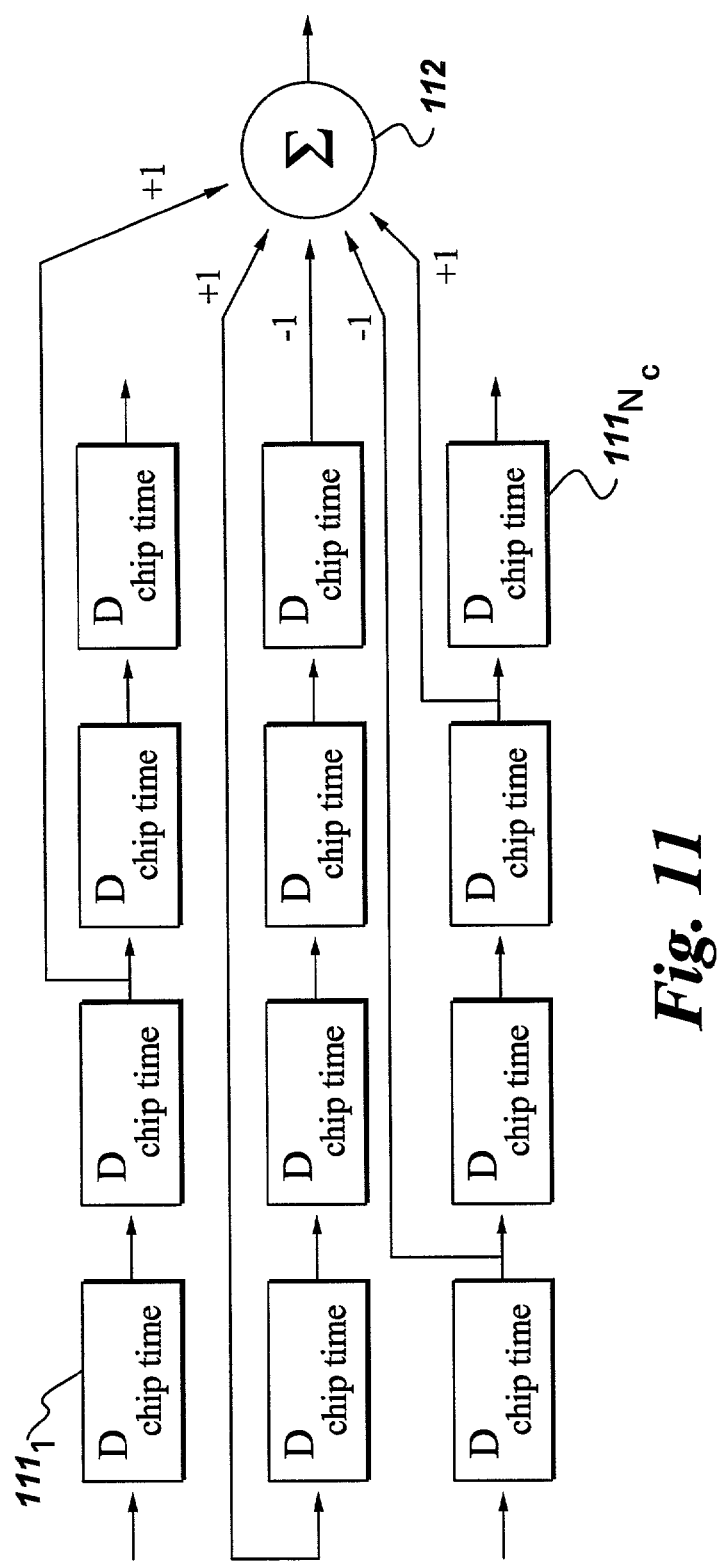
FIG. 11 is a block diagram of a simple example of the delay-hopped code correlator.

The structure of one embodiment of the CDMA code correlator is depicted in FIG. 11. The specific code correlator depicted uses a CDMA code word that matches the correlator bank output depicted in FIG. 10. The code word correlator comprises multiple chip time delays ($D_{chip\ time}$) $111_1$ to $111_{N_c}$, and a summer 112. Note that the chip time delays ($D_{chip\ time}$) and signs (additions and subtractions) cause the elementary correlator peaks to be aligned in time with the same signs. The delayed outputs of the analog-to-digital converters (ADCs) from the CDMA code word correlator are summed by the summer and provided as the output. Since the sample period of the ADCs has been specified to be a fraction of the chip period, the delays in FIG. 11 may, in one embodiment, all be implemented as a number of digital storage devices, with provision for passing stored data from one to the next. Thus, in one embodiment, the CDMA code word correlator of FIG. 11 depicts a synchronous digital circuit such as would be implemented in a programmable logic device (PLD), such as a field programmable gate array (FPGA) or the like, or an application specific integrated circuit (ASIC).

Once the output samples of the code word correlator (represented by black diamonds in FIG. 12) have been formed, the receiver must decide if a code word has been received during the last sample interval. If this decision is positive, other data must be derived from the samples. In the data transmission application of TR/DH, the code word would be modulated by a ±1 which would represent the transmitted information.

Figure 12:
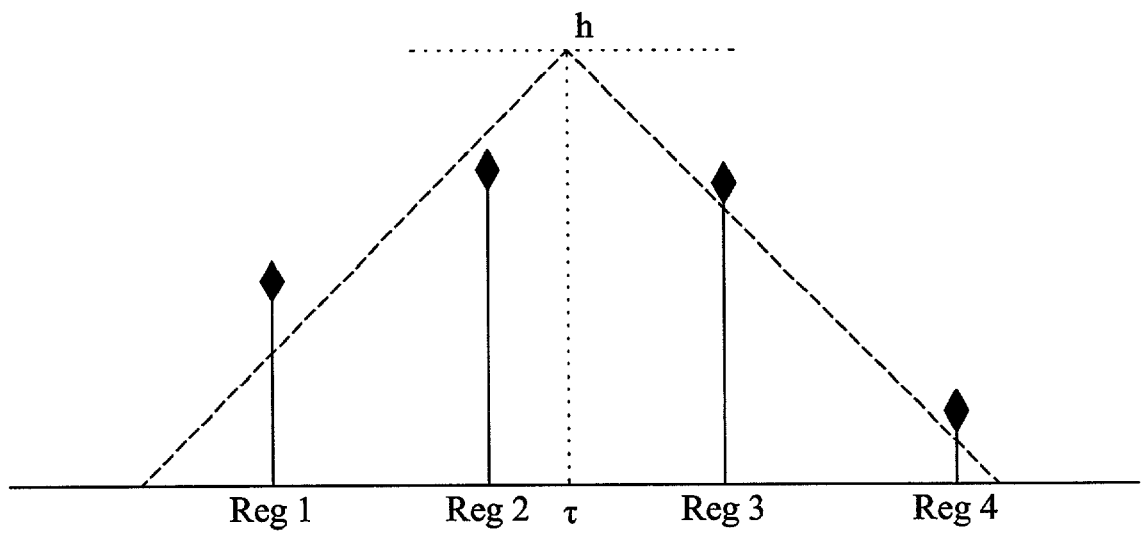
FIG. 12 is a diagram illustrating the output of the DH code correlator.

For the application of this invention, the time at which the code word was received is the most important piece of information. One way to estimate this value is to fit a model of the pulse-pair correlator output waveform to the samples at the output of the code word generator. Such a fit could be done on the basis of minimum squared error, which would result in the optimum fit for Gaussian observation noise. The possible result of this algorithm is shown in FIG. 12, superimposed over the sample values. The fitted model, which is triangular in shape to match the main lobe of the DH CDMA code correlator output function, is controlled by two parameters, the height of the peak, h, and the location in time of the peak, τ. This information can be supplemented by the sum of squared errors for the best fit whose peak value is within the current sample interval. The absolute value of the peak value and the sum of squared errors can be combined and compared to a threshold to detect the code word. The value of τ can be used as an estimate of the time of arrival of the code word.

In particular, the minimum mean squared error estimate of the height of the fitted triangle, given the DH code correlator output data $\{x_0, x_1, \ldots, x_N\}$ is given by $$\hat{h}\phi = \frac{\sum_{n=0}^{N} x_n T(n, \phi)}{\sum_{n=0}^{N} T^2(n, \phi)}$$

where the function $T(n,\phi)$ is a triangular model of the expected waveform. The first argument, n, is the sample number; the adjacent samples of the model may be considered to be separated by the same time interval as are the data samples. There will be N+1 samples in the model, corresponding to the number of samples expected in the mainlobe of the code correlator output waveform. The second argument of the model is the relative phase of the model with respect to the samples used in the multiplications above. The phase of the model can be explained by assuming that the model is sampled at some high rate, say M times the output sample rate of the code correlator, and so the entire model is composed of M(N+1) samples. M different sets of (N+1) model points can be chosen, for which the model points are separated by M high-rate samples. Each of these sets of model points can be regarded as a different phase of the model, for phases indexed $\phi=1, \ldots, M$.

When the receiver is looking for a TR/DH code word without any prior synchronization information, the algorithm just described is executed for each new set of samples, that is, at the end of each sample interval. For each new sample, all phases of the model must be applied to the last (N+1) saved data samples. When a set of results is computed for which the height exceeds a pre-determined threshold and the modeling error is lower than the error values computed for all near-by phases of the model, then we convert that sample number and phase into a time of arrival for the TR/DH burst. The resulting time-of-arrival measurement is known relative to the ADC sample clock 87, which determines the output sample times of the DH CDMA code correlator 85.

It is worth noting that, for the impulse radio version of the invention, the output of the pulse-pair correlator is only approximately triangular, even given an ideal finite-interval integrator. This is because the individual pulse-pair correlator output waveforms are not smoothly triangular, but rather ascend and descend in discrete steps, rather than smoothly, as shown in FIG. 10. The locations of these steps in time change randomly and correspond to the times of arrival of individual pulse pairs. It can be shown that the sum of such waveforms converges to a triangle. On the other hand, for a noise carrier, the chip waveforms are triangular.

In the time-of-arrival (TOA) estimation method described above, what is actually measured is the time of the peak of the last chip signal of the packet. This peak represents the time at which pulse-pairs separated by a certain lag stop arriving, and that lag corresponds to the lag of the last chip send to form the code word. If the transmitting device has only a direct-path transmission from the transmitter to the receiver, then the time-of-arrival value will be determined by the time of transmission and the distance between the receiver and the transmitter involved.

On the other hand, any multipath will tend to spread out (in time) the peaks of the chip signals, which will have the effect of delaying the detected times of arrival relative to the direct path times of arrival. This delay will amount to about half the observed multipath spread and is likely to be on the order of 10 to 50 ns for an indoor environment resembling an office building. (See Saunders, *Antennas and Propagation for Wireless Communication Systems*, John Wiley & Sons, 1999, pp. 282-285.)

Another potential source of inaccuracy in the TOA estimate is clock mismatch between the transmitter's chip clock and the receiver's sample clock. Such a mismatch has the effect of shifting the locations of the samples on the waveforms that emerge from the pulse-pair correlators' integrators. Over the course of the reception of a transmitted TR/DH word, this precession of the phase of the sample clock with respect to the phase of the received waveform has the effect of smearing out the output waveform in time. For example, if the transmitted word is 400 microseconds long, and the transmit and receive clock frequencies are mismatched by 10 PPM, then the composite waveform at the output of the CDMA code correlator will be smeared by 4 nanoseconds. The expected value of the resulting TOA estimation error would be half that value. Unlike multipath, which produces only over-estimation errors, this precession in clock frequencies may result in either ovr- or under-estimation of the TOA. Those skilled in the art will appreciate that the maximum clock mismatch is determined by the stability of the oscillators used to produce the transmit and receive clock waveforms. The maximum clock frequency mismatch and the allowable error due to it will determine the maximum length of a word that may be coherently combined to form a TOA estimate, and therefore the maximum length of a TR/DH preamble. The word length directly influences the detection probability, and therefore the maximum transmission range. Such design trade-offs can be made by one skilled in the art.

In general, the accuracy of the time-of-arrival estimate will decrease with the noise level and the multiple access interference level. On the other hand, the accuracy will increase with the length of the code word, because the effective SNR of the final step will increase with coding gain. The accuracy will also increase with the sample rate, because with more samples the error in fitting the model will decrease.

Experimentation with prototype TR/DH transmitters and receivers in an indoor environment has shown that the accuracy of the method described above is in the range of less than ten nanoseconds of error. In a typical indoor multipath situation, this means that the uncertainty in the onset time of the inbound burst is still dominated by the two-way propagation time.

Returning to FIG. 8, we will describe the mechanism for deriving a time mark from a TR/DH received word and using it to trigger a transmitter for the narrowband burst data transmission. The output samples of the DH CDMA code correlator 85 are input into a polyphase filter and threshold logic module 86. This module implements the minimum mean squared error computations given above. This is a polyphase computation in that, for every input sample, all the squared error computation must be done for all the phases of the waveform model. Since the input to this module could be sampled at a rate as great as 20 Msamples/second, this module will be implemented as a small ASIC or PLD. Alternatively, for lower sample rates and longer chip times, this function could be implemented in a digital signal processor (DSP).

The output of the polyphase filter and threshold logic module 86 would be conveniently expressed in the form of a sample number, relative to the most recent sample, and a phase, which can be regarded as a fraction of a sample period. This numerical data identifies a moment in time and must be converted into a trigger signal that starts the narrowband transmitter at the proper time. In order for this operation to proceed, at least some of the data to be transmitted must have been gathered and buffered prior to generation of the start signal. The function of generating the start signal is performed by the generate start time signal block 88, which is most conveniently implemented by a DSP that has access to the sample clock 87 to which the numerical time mark is referenced. The start signal is input to the narrow band telemetry transmitter 89, which receives and buffers bits to be transmitted. The transmitter 89 is connected to its own antenna 90.

Note that, although the sample clock 87 is the only clock shown on the block diagram of FIG. 8, one or more higher frequency clocks will have to be distributed to run the ASICs PLDs or DSPs used in the implementation. These clocks are not shown in FIG. 8.

While the invention has been described in terms of preferred embodiments, those skilled in the art will recognize that the invention can be practiced with modification within the spirit and scope of the appended claims.

What is claimed is:

1. A method for synchronizing a radio telemetry system using radio frequency (RF) burst communications comprising the steps of:
    generating at a base station a transmitted-reference (TR) pilot signal transmission, wherein the TR pilot signal is delay-hopped to provide a transmitted-reference, delay-hopped (TR/DH) pilot signal comprising a code word comprising chips, wherein the chips are transmitted sequentially, in a fixed duration, Tc, and each chip comprises pulse pairs;
    transmitting by the base station the TR/DH pilot signal to a plurality of mobile devices in the radio telemetry system;
    using the TR/DH pilot signal, a TR/DH receiver, and time-of-arrival estimator in each of the plurality of mobile devices to acquire synchronization with the base station;
    generating and buffering telemetry data at each of the plurality of mobile devices; and
    transmitting by each of the plurality of mobile devices telemetry data at a predetermined time after synchronization with the base station.

2. The method for synchronizing the radio telemetry system recited in claim 1, wherein the RF burst communications is a burst of time modulated ultra-wideband (UWB) communications transmission.

3. The method for synchronizing the radio telemetry system recited in claim 1, wherein the TR/DH pilot signal comprises two noise signals transmitted for a time period of duration Tc.

4. The method for synchronizing the radio telemetry system recited in claim 1, wherein the transmissions from each of the plurality of the mobile devices to the base station are a narrowband modulation.

5. The method for synchronizing the radio telemetry system recited in claim 4, wherein the narrowband modulation is Gaussian Minimum Shift Keying (GMSK).

6. The method for synchronizing the radio telemetry system recited in claim 1, wherein the radio telemetry system uses a time division, multiple access (TDMA) scheme for transmitting telemetry data.

7. The method for synchronizing the radio telemetry system recited in claim 1, wherein the radio telemetry system uses a time slotted transmission scheme for transmitting telemetry data.

8. A radio telemetry system using radio frequency (RF) burst communications comprising:
    a pilot signal generator at a base station for generating a transmitted-reference (TR) pilot signal, wherein the TR pilot signal is delay-hopped to provide a transmitted-reference, delay-hopped (TR/DH) pilot signal, the base station broadcasting the TR/DH pilot signal to a plurality of mobile devices, the TR/DH pilot signal comprising a code word comprising chips, wherein the chips are transmitted sequentially, in a fixed duration, Tc, and each chip comprises pulse pairs;
    a TR/DH receiver and time-of-arrival estimator at each of the plurality of mobile devices for detecting the TR/DH pilot signal and using the TR/DH pilot signal to acquire synchronization with the base station;
    a data buffer for temporarily storing telemetry data at each of the plurality of mobile devices; and
    a transmitter at each of the plurality of mobile devices for transmitting buffered telemetry data at a predetermined time after synchronization with the base station.

9. The radio telemetry system as recited in claim 8, wherein the RF burst communications is a burst of time modulated ultra-wideband (UWB) burst communications transmission.

10. The radio telemetry system as recited in claim 8, wherein the TR/DH pilot signal comprises two noise signals transmitted for a time period of duration Tc.

11. The radio telemetry system as recited in claim 8, wherein the transmissions from each of the plurality of mobile devices to the base station are a narrowband modulation.

12. The radio telemetry system as recited in claim 11, wherein the narrowband modulation is Gaussian Minimum Shift Keying (GMSK).

13. The radio telemetry system as recited in claim 8, wherein the radio telemetry system uses a time division, multiple access (TDMA) scheme for transmitting telemetry data.

14. The radio telemetry system as recited in claim 8, wherein the radio telemetry system uses a time slotted transmission scheme for transmitting telemetry data.

15. The radio telemetry system as recited in claim 8, wherein the TR/DH receiver further comprises:
   a bank of pulse pair correlators receiving the TR/DH pilot signal and generating outputs;
   a bank of analog-to-digital converters (ADCs) digitizing the outputs of the bank of pulse pair correlators;
   a DH code word correlator receiving the digitized outputs from the bank of ADCs and generating a correlation output; and
   time estimation logic receiving the correlation output of the DH code word correlator and generating timing information for generating a numerical time-of-arrival (TOA) estimate.

16. The radio telemetry system as recited in claim 15, wherein the DH code word correlator is implemented as an application specific integrated circuit (ASIC).

17. The radio telemetry system as recited in claim 15, wherein the DH code word correlator is implemented as a programmable logic device (PLD).

18. The radio telemetry system as recited in claim 15, wherein the time estimation logic detects the TR/DH pilot signal by estimating a TOA of a burst of RF composed of a TR/DH code word using a model.

19. The radio telemetry system as recited in claim 15, wherein the time estimation logic is implemented using an application specific integrated circuit (ASIC).

20. The radio telemetry system as recited in claim 15, wherein the time estimation logic is implemented using programmable logic device (PLD).

21. The radio telemetry system as recited in claim 15, wherein the time estimation logic includes a programmable digital signal processor (DSP) to convert a numerical TOA estimate to a clock edge for controlling a start of transmission of telemetry data.

22. A mobile device for a radio telemetry system comprising:
   a receiver for detecting a transmitted-reference, delay-hopped (TR/DH) pilot signal to acquire synchronization with a central transmitter based on a periodic epoch in the TR/DH pilot signal, wherein the TR/DH pilot signal comprises a code word comprising chips, the chips are transmitted sequentially, in a fixed duration, Tc, and each chip comprises pulse pairs;
   a buffer for temporarily storing telemetry data; and
   a transmitter for transmitting buffered telemetry data at a predetermined time after synchronization with the central transmitter.

23. The mobile device for the radio telemetry system as recited in claim 22, wherein the TR/DH pilot signal comprises two noise signals transmitted for a time period of duration Tc.

24. The mobile device for the radio telemetry system as recited in claim 22, wherein the transmission from the mobile device to the base station is a narrowband modulation.

25. The mobile device for the radio telemetry system as recited in claim 24, wherein the narrowband modulation is Gaussian Minimum Shift Keying (GMSK).

26. The mobile device for the radio telemetry system as recited in claim 22, wherein transmission of buffered telemetry data is based on a time division, multiple access (TDMA) scheme.

27. The mobile device for the radio telemetry system as recited in claim 22, wherein transmission of buffered telemetry data is based on a time slotted transmission scheme.

28. A method for synchronizing a radio telemetry system, comprising:
   synchronizing a plurality of mobile devices with a base station based on a periodic bit-time epoch carried by a delay-hopped pilot signal originating from the base station, the delay-hopped pilot signal comprising a code word having chips transmitted sequentially in a fixed duration, each chip comprising pulse pairs.

29. The method as recited in claim 28, wherein the delay-hopped pilot signal comprises a transmitted-reference, delay-hopped (TR/DH) pilot signal.

30. The method as recited in claim 28, wherein the delay-hopped pilot signal comprises at least two noise signals having a transmission time duration.

31. A system for synchronizing a radio telemetry system, comprising:
   a computer-readable medium; and
   code disposed on the computer-readable medium, wherein the code is configured to synchronize a remote device with a base station based on a periodic bit-time epoch carried by a delay-hopped pilot signal originating from the base station, the delay-hopped pilot signal comprising a code word having chips transmitted sequentially in a fixed duration, each chip comprising pulse pairs.

32. The method as recited in claim 31, wherein the delay-hopped pilot signal comprises a transmitted-reference, delay-hopped (TR/DH) pilot signal.

33. The method as recited in claim 31, wherein the delay-hopped pilot signal comprises at least two noise signals having a transmission time duration.

34. A method for synchronizing a radio telemetry system using radio frequency (RF) burst communications comprising the steps of:
   generating at a base station a transmitted-reference (TR) pilot signal transmission, wherein the TR pilot signal is delay-hopped to provide a transmitted-reference, delay-hopped (TR/DH) pilot signal comprising two noise signals transmitted for a time period of duration Tc;
   transmitting by the base station the TR/DH pilot signal to a plurality of mobile devices in the radio telemetry system;
   using the TR/DH pilot signal, a TR/DH receiver, and time-of-arrival estimator in each of the plurality of mobile devices to acquire synchronization with the base station;
   generating and buffering telemetry data at each of the plurality of mobile devices; and
   transmitting by each of the plurality of mobile devices telemetry data at a predetermined time after synchronization with the base station.

35. A radio telemetry system using radio frequency (RF) burst communications comprising:
   a pilot signal generator at a base station for generating a transmitted-reference (TR) pilot signal, wherein the TR pilot signal is delay-hopped to provide a transmitted-reference, delay-hopped (TR/DH) pilot signal, the base station broadcasting the TR/DH pilot signal to a plurality of mobile devices, the TR/DH pilot signal comprising two noise signals transmitted for a time period of duration Tc;
   a TR/DH receiver and time-of-arrival estimator at each of the plurality of mobile devices for detecting the TR/DH pilot signal to acquire synchronization with the base station;
   a data buffer for temporarily storing telemetry data at each of the plurality of mobile devices; and a transmitter at each of the plurality of mobile devices for transmitting buffered telemetry data at a predetermined time after synchronization with the base station.

36. A mobile device for a radio telemetry system comprising:
  a receiver for detecting a transmitted-reference, delay-hopped (TR/DH) pilot signal to acquire synchronization with a central transmitter based on a periodic epoch in the TR/DH pilot signal, wherein the TR/DH pilot signal comprises two noise signals transmitted for a time period of duration Tc;
  a buffer for temporarily storing telemetry data; and
  a transmitter for transmitting buffered telemetry data at a predetermined time after synchronization with the central transmitter.

37. A method for synchronizing a radio telemetry system, comprising:
  synchronizing a plurality of mobile devices with a base station based on a periodic bit-time epoch carried by a pilot signal originating from the base station, the pilot signal comprising at least two noise signals having a transmission time duration.

38. A system for synchronizing a radio telemetry system, comprising:
  a computer-readable medium; and
  code disposed on the computer-readable medium, wherein the code is configured to synchronize a remote device with a base station based on a periodic bit-time epoch carried by a pilot signal originating from the base station, the pilot signal comprising at least two noise signals having a transmission time duration.

* * * * *